United States Patent
Curtis

(10) Patent No.: US 7,047,299 B1
(45) Date of Patent: May 16, 2006

(54) GENERIC CLUSTER AWARE LOCK BROKER WITH USER DEFINED LOCKING MODES

(75) Inventor: James R. Curtis, Placerville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

(21) Appl. No.: 09/942,910

(22) Filed: Aug. 31, 2001

(51) Int. Cl.
*G06F 15/173* (2006.01)

(52) U.S. Cl. ............... 709/225; 709/226; 709/223; 709/238

(58) Field of Classification Search ........ 709/223–229; 714/13, 4, 1; 710/108, 200; 370/230, 231
See application file for complete search history.

(56) References Cited

U.S. PATENT DOCUMENTS

| | | | | |
|---|---|---|---|---|
| 5,596,754 A | * | 1/1997 | Lomet | 710/200 |
| 5,699,500 A | * | 12/1997 | Dasgupta | 714/1 |
| 6,438,705 B1 | * | 8/2002 | Chao et al. | 714/4 |
| 6,466,978 B1 | * | 10/2002 | Mukherjee et al. | 709/225 |
| 2001/0056554 A1 | * | 12/2001 | Chrabaszcz | 714/13 |

* cited by examiner

Primary Examiner—Jeffrey C. Pwu

(57) ABSTRACT

The present invention provides a process for implementing a generic Cluster wide lock broker that enables Clients attached to a Node on the Cluster to determine whether a lock can be established on a Resource and whether conflicting active locks are already held by another Peer Node. The process utilizes lock request that include a lock name identifying the desired Resource. Each lock request is compared by a lock broker daemon resident on each Node of the Cluster against a Lock Broker Table identifying active locks currently held by any client associated with each specific Peer Node. Additionally, the process enables the use and creation of customized locks by utilizing intent modes, which designate how a Client desires to utilize a Resource, and deny modes, which designate how a Client desires to prevent other Clients from utilizing a Resource. Further, lock requests initially denied because an active lock exists for the desired Resource can be placed in a wait state and re-requested upon releasing of the active lock.

19 Claims, 4 Drawing Sheets

GENERIC CLUSTER AWARE LOCK BROKER WITH USER DEFINED LOCKING MODES

TECHNICAL FIELD

The present invention relates to the field of controlling access to devices on clustered computer systems. More specifically, the present invention relates to the brokering of locks utilized on a cluster to control access and/or usage of particular devices and/or elements of a clustered network of computer systems.

BACKGROUND

Commonly, pluralities of computers, databases, printers and other computing or computing related devices are often established in clusters or as members or elements of a network, hereafter, collectively "Clusters". Clusters are often defined as a parallel or distributed system that consists of a collection of interconnected whole computers, that is utilized as a single, unified computing resource. As such, it is commonly appreciated that Clusters commonly consist of computing devices (i.e., nodes) and other peripheral devices to which access thereto may be controlled by particular nodes. Clusters enable information system managers to share a computing load over several systems, thereby enhancing the capabilities of the system as a whole, minimizing the adverse effects of failures of certain nodes or devices on a Cluster, and allowing for the expansion of capacity and capabilities of a given Cluster by adding additional or different nodes and/or devices to the Cluster.

As Clusters have increased in size and complexity, interest has arisen in processes for managing the utilization of resources associated with a Cluster (for example, printers, processors, data storage devices, data files, displays and other virtual and real resources). Throughout this description a device, whether real or virtual, accessible or utilized by a Cluster shall be referred to hereinafter as a "Resource". Similarly, a computing device (for example, a processor, server, mainframe computer or similar device) utilized in the utilization of itself or other Resources, which may be directly or indirectly connected to or accessed by such a computing device, shall be referred to hereinafter as a "Node". Those skilled in the art appreciate that Resources and Nodes can include practically any electronic device and be configured in any configuration desired.

Additionally, many large Clusters, in addition to managing access to Resources, have to ensure that sufficient Resources are highly available (i.e., the Resources are guaranteed to have a minimum operating reliability often measured in the 99.999% and better ranges). As such, efficient and effective processes for managing the utilization of Resources are highly desirable.

Currently, one method for managing Resources on a Cluster utilizes databases that are maintained by every Node on the Cluster. These databases keep track of which Resources are being utilized at any particular time by any client throughout the Cluster. As is commonly appreciated, a client may be another Resource on a Cluster, a device external to the Cluster (for example, a web browser on a user's personal computer (i.e., a Node) connected to an Internet based Cluster), or anything else that requires access to a Resource associated with a Cluster. Those persons, Resources, Nodes, Clusters and/or any other entity that desires to utilize a Resource on a Cluster are hereinafter collectively referred to as a "Client".

Since Clusters can often be quite large with numerous Resources being utilized by widely dispersed Clients, keeping such databases up to date is often an inefficient and inaccurate process. For example, in order to determine whether a Resource is currently being utilized and then to reserve a Resource, the multi-node database approach often requires a Node to keep track of every lock maintained on the Cluster. When a Client desires to lock-up a Resource, the Client's Node then has to determine whether any other Node has a lock on the Resource via its look-up tables. Further, when a lock is released, the Node then has to notify every other Node on the Cluster of the releasing of the lock. At which instance, every Node on the Cluster must update their respective lock tables. As such, this approach can be very time intensive for all the Nodes on a Cluster. Thus, a better process is needed.

Another process commonly utilized to reserve and/or "lock-up" a Resource is to utilize a proxy maintained by a proxy server identified for the Resource. This approach eliminates the need for each Node on the Cluster to maintain up-to-date databases or listings identifying the utilization of every Resource on the Cluster. Instead, a single Node provides the beforementioned proxy services. Usually, but not always, this Node is the Node by which the specific Resources are accessed and/or controlled. However, this approach is often undesirable because control of the Resource is often maintained by a single Node. If the Node controlling a Resource fails, for whatever reason, often the jobs to be processed by the Resource (which commonly are located on a proxy queue in a local memory device associated with the Node) are lost and are not recoverable. As such an efficient and reliable process for determining whether a Resource on a Cluster is available and "locking-up" the Resource, when available, is needed.

SUMMARY

The technical field provides a process for implementing a generic Cluster wide lock broker that allows various modes of locking up Resources on the various Nodes of a Cluster. The process utilizes a daemon, a CMLOCK daemon, to control the requesting, keeping and releasing of locks on Resources. The CMLOCK daemon is implemented on each "up" Node of the Cluster and communicates with other CMLOCK daemons on the other Nodes of the Cluster via a Cluster-wide broadcast communication mechanism. For "down" Nodes the CMLOCK daemon is suitably halted, thereby preventing "down" Nodes from locking up Cluster Resources.

The CMLOCK daemon controls the "locking-up" of Resources by utilizing a request that consists of three components, a lock name, an intent mode and a deny mode. The lock name identifies the Resource for which the request is submitted. The intent mode identifies those modes in which the Client desires to "lock-up" the Resource. The deny mode identifies those modes in which the Client desires to deny requests from peers for the same lock. The deny mode is operative only upon any Client obtaining the lock on the Resource. It is to be appreciated that multiple Clients may maintain a lock simultaneously on a Resource if their intent mode and deny mode support such concurrency. The CMLOCK daemon on each Node tracks the status of locks on Resources by using a Lock Table specific to each Node. By examining responses from other Nodes (identifying whether a particular lock on a Resource has already been obtained by a Client for that Node), a particular CMLOCK daemon can determine whether a Resource is available and reserve ("lock-up") the Resource without needing to maintain records of every lock initiated by every other Client and/or Node and without having to inform every Node whenever a lock is established and/or removed. Further, the process does not rely upon proxies or other single point failure systems for determining when a Client may access a Resource.

In a second embodiment, the process also provides the capability of viewing locks currently held by other Clients on other Nodes. This embodiment utilizes the Cluster-wide broadcast communications capabilities of the CMLOCK daemon to request from other "up" Nodes those locks the CMLOCK daemons have established on each of such Nodes. As such, this process also provides a quick and efficient process for determining and monitoring Resource utilization on a Cluster.

Additionally, the process of the present invention provides the capability for a Client to establish pending lock requests, which enable the Client, via their host Node and associated CMLOCK daemon, to re-request a lock on a Resource when a previously existing lock (which prevented the requesting Client from gaining the desired access to the Resource) is released. The Node establishes the denied lock in a pending state. Utilizing the Cluster-wide broadcast communications capabilities, a CMLOCK daemon "locking-up" a Resource may notify all other CMLOCK daemons on "up" Nodes for the Cluster whenever a lock held by the daemon is released. Unlike a proxy or queue system, wherein the Node associated with a Resource establishes a queue of requests, the present invention does not utilize a queue and instead merely notifies all Nodes of a specific lock being released. The Nodes interested in the Resource may then attempt to lock up the Resource with the first Node to request obtaining the lock on the Resource.

As such, the technical field provides a process for determining the availability and locking up of Resources on a Cluster without requiring all Nodes on a Cluster to monitor the status of the various Resources on the Cluster and without requiring the Cluster to utilize proxies, queues or similar techniques to assign a currently locked Resource to a subsequent Client. The capabilities, process flows, and other specifics of the present invention and its various embodiments are further described herein in the following specification, claims and drawing figures.

DETAILED DESCRIPTION

The technical field a process for managing the utilization of Resources on a Cluster. The process utilizes a daemon, a CMLOCK daemon, to perform such operations. As is commonly known, a daemon is a process that runs in the background and performs a specified operation at predefined times or in response to certain events. Often a daemon is interpreted as being a process that is implemented in a UNIX® environment/operating system. However, in the this application, the term daemon is to be construed as being a process that runs in the background of any operating system and is not to be construed as being limited to the UNIX environment. As such, other environments, including, but not limited to, MICROSOFT® WINDOWS®, APPLE® MACINTOSH®, and other environments, may be utilized. Typical daemon processes include print spoolers, e-mail handlers, and other programs that perform administrative tasks for the operating system. In short, any environment or operating system, which is capable of implementing background processes and supports communications between the various Nodes of the Cluster(s), may be utilized in conjunction with the present invention.

Figure 1:
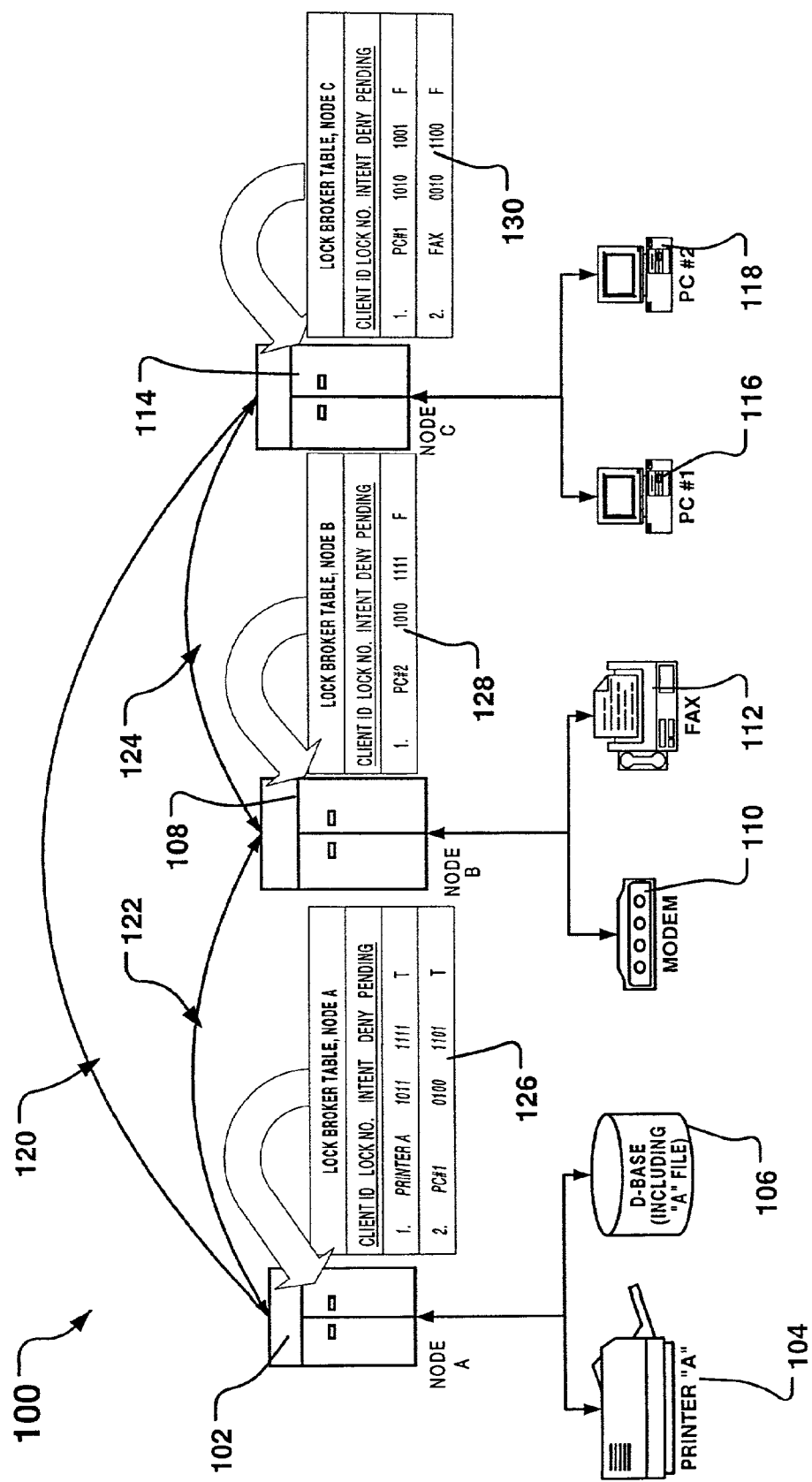
FIG. 1 is a schematic representation of one Cluster of computing devices for which a lock brokering processes of the present invention may be utilized.

FIG. 1 illustrates one embodiment of the process being implemented on a three Node Cluster. As shown, a Cluster 100 includes Node A 102, which is connected to Resources Printer A 104 and D-base A 106. Further, the Cluster 100 includes Node B 108 which is connected to a modem 110 and a fax machine 112. Additionally, Node C 114 is included in the Cluster 100 and is attached to PC#1 116 and PC#2 118. Each Node is connected to each other Node in the Cluster 100 by suitable communications links 120, 122, and 124. It is to be appreciated that Nodes in a Cluster or other network configuration may be connected utilizing various connectivity schemes including, but not limited to, utilizing hubs, routers, star configurations, serial connections, parallel connections, token ring connections, Ethernet configurations, Internet connections and numerous others. This application is not directed to how Nodes in a Cluster are connected and merely specifies that some connection between Nodes on a Cluster or multiple Clusters is provided.

Further, it is to be appreciated that any Node on a Cluster may be suitably connected and/or utilized to control any type or number of Resources. Those Resources shown in FIG. 1 are for purposes of illustration and explanation only and are not to be construed as limiting any of the embodiments of the present invention to such a configuration. Similarly, it is to be appreciated that physical Resources, such as a D-base 106 and/or the PCs 116/118 may be broken into various logical as well as physical devices. Each such logical and/or physical device may be considered a Resource in and of itself for whose control various Clients may request, monitor and/or obtain.

The CMLOCK daemon is appropriately loaded onto each of the Nodes. The CMLOCK daemon creates a table, a Lock Broker Table (126, 128 and 130), as shown next to each Node, which is utilized to determine which locks have been requested by a Client utilizing a particular Node (for example, one using the PC#1 116 Resource connected to Node C 114). Locks are registered by the CMLOCK daemon on a single Node's Lock Broker Table in either a pending state or an active locked state. As shown in FIG. 1, the Node A Lock Broker Table 126 is holding two locks, a pending lock request for Printer A 104 (the pending status is designated in FIG. 1 by the "T" under the pending column, whereas an "F" indicates an active lock) and a pending lock request for PC#1 116. Further, the Lock Broker Table 126 identifies the client, by a Client ID, requesting the lock for the particular Node. The CMLOCK daemon utilizes the Client ID when it needs to notify a client that the lock operation was or was not successful. Similarly, the Node B Lock Broker Table 128 is holding an active lock on PC#2 118, and the Node C Lock Broker Table 130 is holding active locks on PC#1 116 and the fax 112.

As discussed previously, the present invention allows a Client to create lock requests for the various resources available on a Cluster. Lock requests can also be requested by Nodes and/or Resources without requiring the interaction or direction of a Client. Regardless of whether a lock request is generated by a Client and/or a Cluster/Node/Resource, each lock request includes three elements: a lock name, an intent mode and a deny mode.

The lock name is unique to each Resource requested and each lock requested. The lock name is utilized to identify Resources desired to be accessed and/or utilized by a Client from a Node. The lock request is generated by a Client connected to a particular Node (for example, Node C) and is only stored (in either an active or a pending state) in the Lock Broker Table associated with the particular Node. So that all the Nodes on a Cluster may be able to determine whether a particular Resource is locked and/or being utilized in a particular manner (as designated by the intent and deny modes), the lock request preferably includes in the lock name an identification of the specific Resource.

Further, it is commonly appreciated that Resources connected to a Node are often identified by an Interrupt Request number. Similarly, Resources connected to a Cluster or other network are often identified by a unique address, for example, an Internet Protocol address. The present invention may be utilized in conjunction with any addressing or identification scheme desired, provided that the Resources are specifically identified as necessary, so that multiple contentions for the same Resources, at the same time are prevented. Further, the lock name may be of any length and/or format desired, but should be of such length so as to specifically identify the Resource being locked.

In addition to providing a lock name, a lock request also includes an intent mode. The intent mode provides an indication of the manner in which the Client, or the requestor of the lock, desires to access the Resource. The intent mode is preferably a 32 bit integer that indicates on a bit-wise basis how a Resource is desired to be utilized by a client. In the tables 126, 128, 130, shown in FIG. 1, four bits are depicted for illustrative purposes, however, it is to be appreciated that any number of bits may be utilized. In short, the intent mode provides an indication to all the other Nodes on the Cluster that the Client desires to utilize a particular Resource in a particular manner. For example, a Client may desire to utilize a data file (for example, a word processing document) such that it is read only (i.e., other Clients can access the file because the Client has requested a read only lock). Similarly, another Client may request to lock up the same data file such that only they can write to the file. Basically, the intent mode specifies how the Client desires to utilize a particular Resource.

The request also includes a deny mode. As provided for the intent mode, the deny mode utilizes an integer number to represent, on a bit-wise basis, how a lock holder of a Resource will allow other Clients to utilize the Resource. As with the intent mode, 32 bits are preferably utilized. However, the deny mode, for example, may exclude all Clients from accessing the Resource, may allow certain Clients to utilize the Resource while denying others, or may utilize any other schema desired. For example, a deny mode might be configured to allow other Clients to access a data file (currently locked by the first Client/lock holder) on a read-only basis while denying access to the data file to any Client who desires to write to the data file. Such a lock might be called a read/write lock.

The process, by which the present invention determines whether a subsequent Client may gain access to a currently "locked" Resource, utilizes two bit-wise exclusive OR comparisons. In the first comparison, the intent mode specified in a lock request is compared to the deny mode for an active lock currently held by a Client. In the second comparison, the intent mode specified by the active lock is compared to the deny mode specified in the lock request. When the results of all the bits compared are "YES", the request is approved. Similarly, when the result of any of the bits compared is "NO", the request is denied. For the first embodiment of the present invention, a denied request is cleared from the Lock Broker Table for the Node upon rejection or termination of the request.

Figure 2:
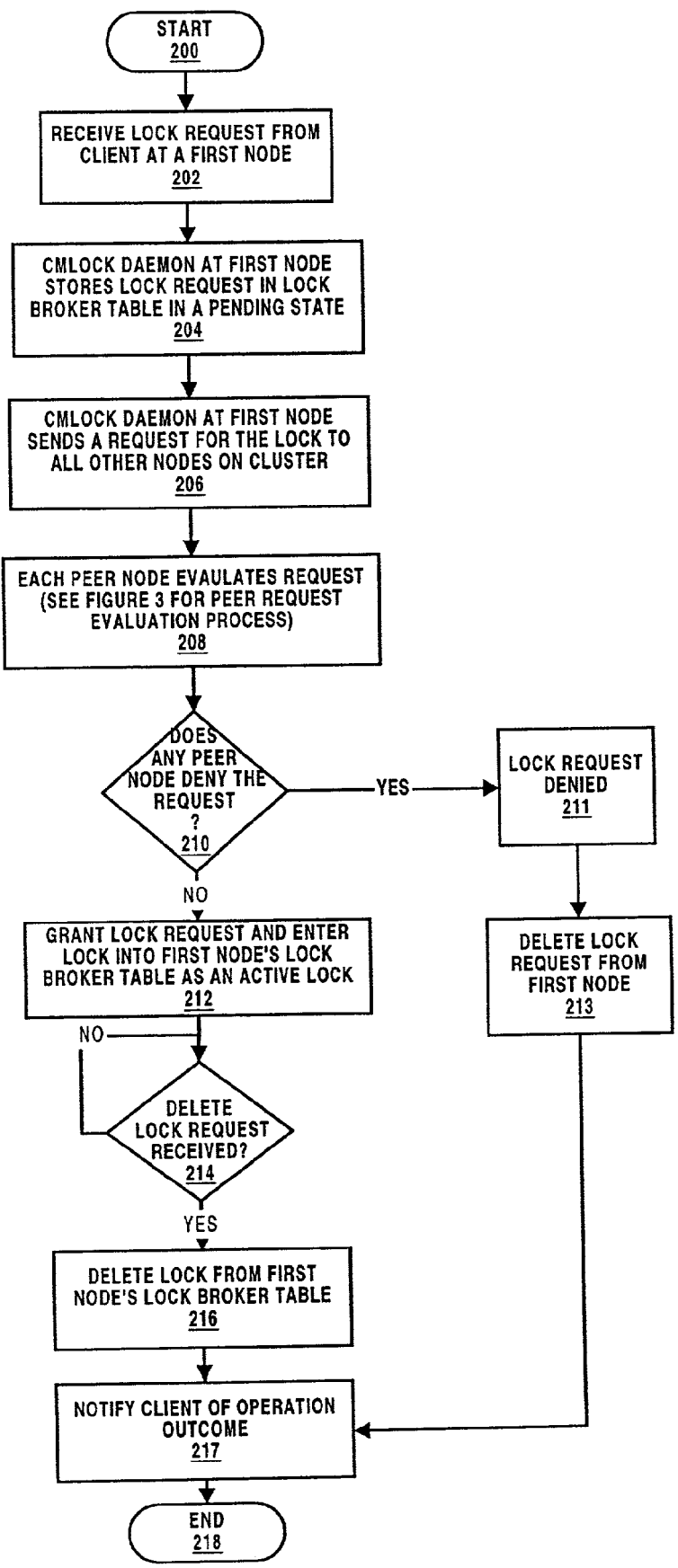
FIG. 2 is a flow diagram of one embodiment of the lock brokering process of FIG. 1.
Figure 3:
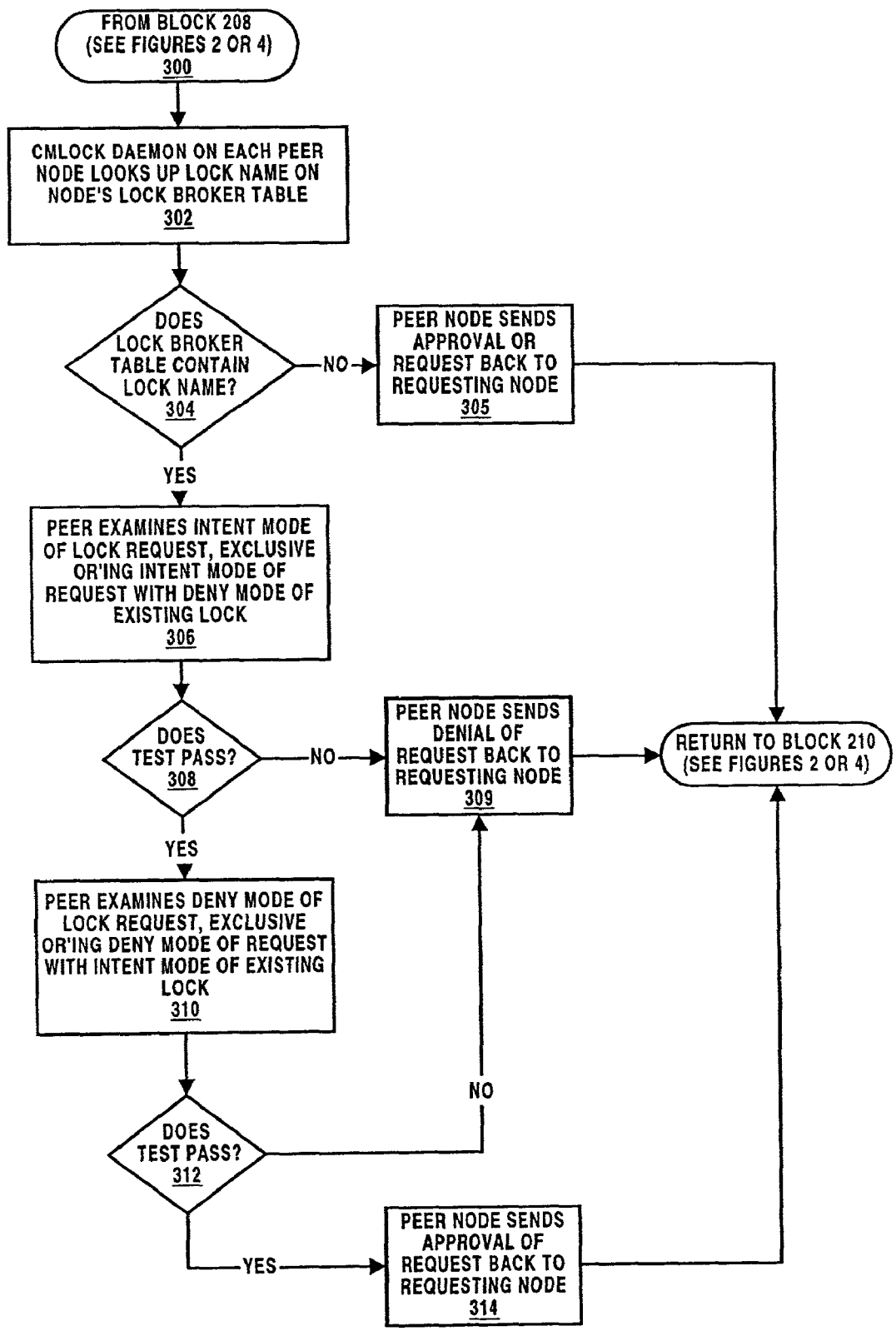
FIG. 3 is a flow diagram of one embodiment of a process provided by the present invention for utilizing lock names, intent modes and deny modes.
Figure 4:
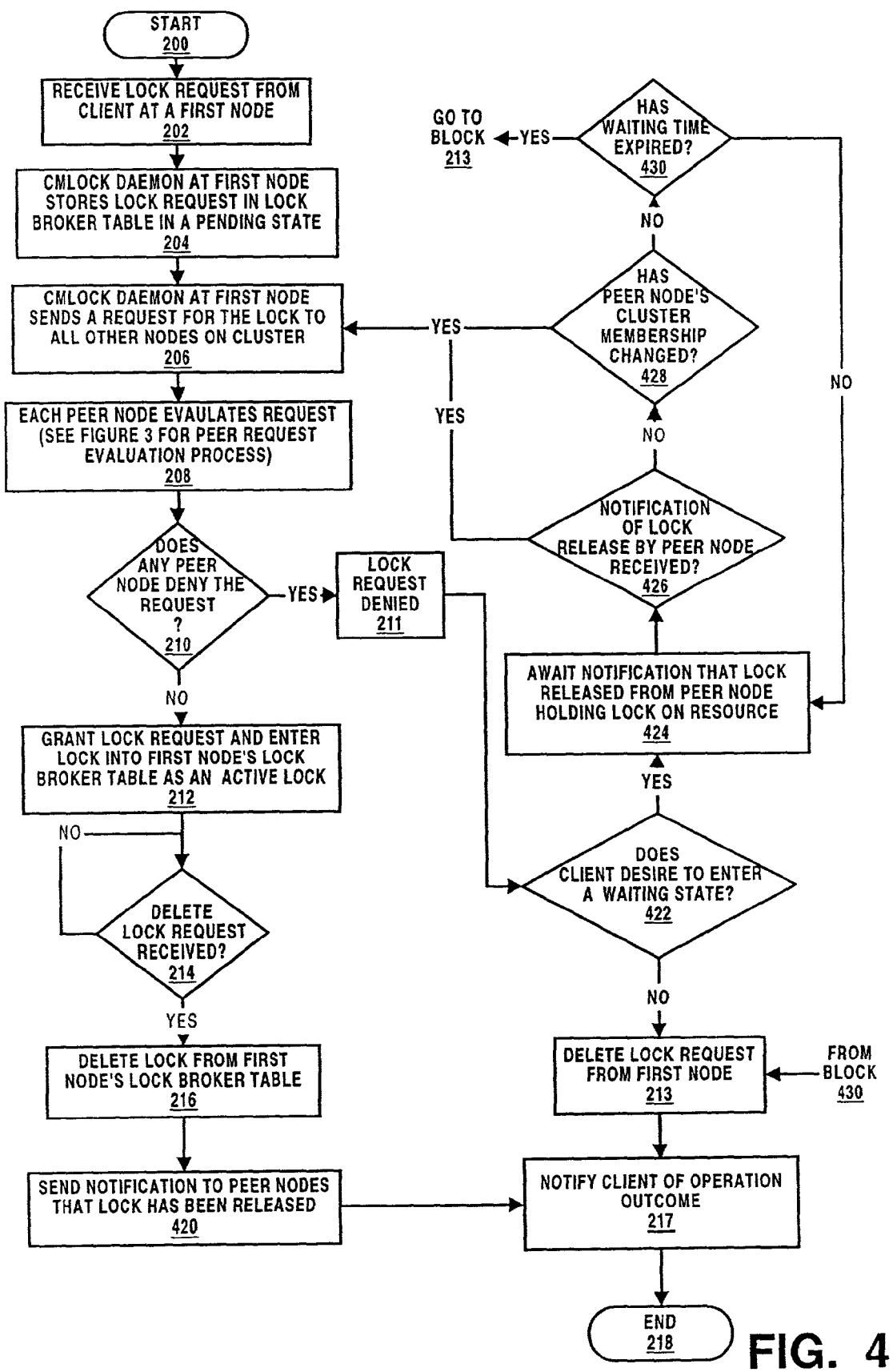
FIG. 4 is a flow diagram of an alternative embodiment of the lock brokering process.

More specifically, the process by which a Client requests a lock, and the CMLOCK daemon determines whether such lock request may be granted is illustrated in FIG. 2. As shown, this process begins with a first Node receiving a lock request from a Client (Block 202). For purposes of explanation, the Node receiving the request is referred to herein as the "First Node". Those other Nodes on the Cluster(s) are referred to herein as the "Peer Nodes". The process flows illustrated in FIGS. 2–4 are depicted with reference to the First Node and one Peer Node. It is to be appreciated, however, that the process steps may be repeated and/or expanded to encompass as many Peer Nodes as are necessary to determine whether a lock can be placed on a Resource associated with a Cluster.

Further, it is to be appreciated that the First Node may receive the lock request via any known techniques by which Resources on a Cluster are locked. Those skilled in the art appreciate the various techniques, systems, and methodologies which may be utilized to request a lock including, but not limited to, a request from a Client (for example, a request to utilize a printer) or a request by a web browser for a connection with a specific network server.

Upon receiving the lock request, the First Node, via the CMLOCK daemon, suitably stores the lock request as a pending request in its associated Lock Broker Table (Block 204). As previously discussed hereinabove, two examples of pending lock requests are shown in FIG. 1 by the italicized entry for Printer A or the entry for PC#1. The pending state exists until every "up" Node responds to the request with either an approval or a denial, as discussed in greater detail hereinbelow.

Next, the First Node communicates the lock request to all the Peer Nodes via the Cluster-wide communications systems (Block 206). When communicating the request, the First Node sends the lock name, the intent mode and the deny mode. For example, the pending request in FIG. 1 for Printer-A would be sent to the Peer Nodes (i.e., Node B 108 and Node C 114) as a request in the following format:

| Name | Intent Mode | Deny Mode |
|---|---|---|
| Printer A | 1011 | 1111 |

The name indicates the Resource requested, i.e., "Printer A. It is to be appreciated that the request name may be in any format, provided it designates the Resource requested.

Upon receiving the request, each Peer Node evaluates the request (Block 208). The process by which each Peer Node evaluates the request is explained with reference to FIG. 3 and is explained in greater detail hereinbelow. Each "up" Peer Node then returns either an approval of the request or a denial (Block 210).

When the lock request is denied (Block 211), the lock request is subsequently deleted from the Lock Broker Table for the First Node (Block 213) and the Client is notified of the operation's outcome (Block 217). Next, the process ends (Block 218). The process will then restart when a subsequent lock request is received at a Node on the Cluster.

When the lock request is approved, the lock request is designated as being in a granted state and is entered into the First Node's Lock Broker Table as an active lock (Block 212). The lock then remains as an active lock until a delete lock request is received (Block 214). When the delete request is received, the lock is deleted from the First Node's Lock Broker Table and the lock is removed from the Cluster (Block 216). The Client is then notified of the operation's outcome (Block 217) and the process ends (Block 218). Note, that for this embodiment no broadcast messages are needed to be sent to any other Node when a lock is deleted from a Node's Lock Broker Table. Since each Node stores only those locks requested by the CMLOCK daemon associated with the Node, broadcast messages are not needed because data files at the Peer Nodes are not updated when a lock is established or released. Peer Nodes do not maintain information concerning locks on other Nodes and, instead, only maintain information relating to locks held by that specific Node.

Referring now to FIG. 4, a modification of the process flow of the embodiment shown in FIG. 2 is provided. In the embodiment shown in FIG. 4, the present invention supports pending lock requests, even if the Resource for which the lock is initial requested has already been locked-up by another Node. As shown, this alternative process flow closely resembles that of FIG. 2 and utilizes the appropriate process steps of FIG. 3, as necessary. In order to illustrate the differences between the process flow shown in FIG. 2 and the process flow used in the embodiment illustrated in FIG. 4, those common steps are identified by the 200 series Block numbers utilized in FIG. 2. Additional process steps utilized in the second embodiment (and not utilized in the first embodiment) are identified by 400 series Block numbers.

As shown, additional operations are provided in the second embodiment when a lock is released (i.e., after Block 216 and before Block 217). These additional operations provide that when a previously granted lock is released by a Node, the releasing Node suitably notifies the Peer Nodes that the lock has been released (Block 420). This notification is preferably accomplished utilizing a Cluster-wide broadcast message, however, other Node-to-Node communications may also be utilized. Further, the notification of the release of the previously granted lock is utilized in this embodiment to signal other Nodes, which may or may not have a wait state request to lock-up a particular Resource, that the Resource is now available for locking. However, it should be noted that this process flow does not require the Node responsible for the Resource, nor the Node which previously had the lock on the Resource to create a proxy of requests for locking the Resource. Instead, each Node is responsible for maintaining wait stated lock requests (i.e., a request to lock-up a Resource which has been denied, but for which the Client is willing to wait for the Resource to become unlocked).

As shown in FIG. 4, upon having a lock request denied, the process flow of this embodiment supports "wait stated requests" by having the CMLOCK daemon associated with the request issue at least one query to the Client as to whether the Client desires to enter a waiting state, as necessary. However, for some requests, the CMLOCK daemon may be pre-programmed to automatically enter a wait state, for example, when processing a printing request (Block 422).

If the Client (or the CMLOCK daemon) does not desire to enter a wait state, the process continues with deleting the lock request from the First Node (Block 213), notifying the Client of the operation's outcome (Block 217) and then the process ends (Block 218).

If the Client (or the CMLOCK daemon) does desire to enter the wait state, the process continues with the First Node awaiting notification, from the Peer Node currently holding the lock, that the lock has been released and the Resource is now available for "locking-up" (Blocks 424, 426) or notification from the Cluster Manager that a Cluster membership change has occurred (Block 428). The Cluster membership may change whenever a Node disconnects from the Cluster (for whatever reason) and any locks held by that Node are then automatically released.

Further, the First Node may be configured to await notification that a lock has been released, and a Resource becomes available, for only a specified period of time (Block 430). If the Resource does not become available within the specified period of time, the process then resumes with Block 213.

Additionally, it is to be appreciated, however, that the CMLOCK daemon utilizes asynchronous operations. As such, the daemon is capable of processing other lock requests by Clients, as well as, processing Peer Node requests and other tasks and functions that may be performed by the daemon, as specified by the specific implementation of the present invention. Such other processes include monitoring the Cluster's membership roster.

When the lock is released or the Peer Node's Cluster membership changes, the Node with the request in the waiting state receives the notification of the lock being released or the Peer Node dropping off the Cluster. Then the process resumes with the CMLOCK daemon at the First Node sending the lock request again to all the Peer Nodes (Block 206). It is to be appreciated that in this embodiment, multiple Nodes may attempt to simultaneously send requests for a Resource to all the other Nodes on the Cluster(s) upon the release of a lock for a popular, or often desired, Resource. In the embodiment shown in FIG. 4, the first to send a lock request upon the release of a previously held lock by another Node will be the first to lock up the Resource. Conflicts between competing requests may be avoided by utilizing priority schemes based upon time of wait, urgency of the request, Node hierarchy and other factors.

Additionally, it is conceivable that two Clients may desire to request the same Resource with exclusive access at the same time. The present invention suitably accommodates this situation by having every request received at a Node compared against both the active and pending lock requests maintained in their respective Lock Broker Tables. This process, for the above described scenario, would result in both lock requests being denied by the other Client. Processing would then resume, for each Client, with Block 211 (FIG. 4). Then depending upon whether either or both Clients had requested wait state processing, each request would be wait stated. Since neither Node owned the lock, the process step in Block 426 would result in the NO path at which instance the request would either await the changing of the other Node's Cluster membership or the expiration of the timer, whichever occurred first.

However, in an alternative embodiment (not shown), the process of FIG. 4 could be modified such that a denial of a request due to a pending lock request of another Node would be identified as such. The requesting Node could then be configured to automatically resend the request based upon any of various factors. Such factors may include waiting until the other Node dropped their respective pending request, utilizing a priority scheme to determine which of the pending requests has priority, or based upon any other process or schema.

As such, the embodiment provided in FIG. 4 provides one embodiment of a process for Nodes to request Resources and await their availability without requiring the storage of lock requests at multiple Nodes. The present invention may be configured, as desired, to utilize other process flows which depend upon a specification of a lock name, an intent mode and a deny mode. Further, the approach shown in FIG. 4 eliminates the need for Clients to repeatedly send rejected requests by temporarily saving Requests (for which a Client is willing to wait) in the Lock Broker Table as a pending or wait status request.

Referring now to FIG. 3, the process by which Nodes on a Cluster determine whether a lock request is allowed or denied is shown. As shown, this process begins in FIG. 2 or FIG. 4 at Block 208 with the receipt of the lock request at the Peer Node (Block 300, FIG. 3). Upon receiving the lock request, the Peer Node looks up whether the lock name exists on their respective Lock Broker Table (Block 302). If the Lock Broker Table does not contain the lock name, the Peer Node sends an approval back to the First Node (i.e., the requesting Node) (Block 305) and the processing continues in FIG. 2 or 4 with Block 210.

If the Peer Node's Lock Broker Table does contain the lock name, the Peer Node continues to examine the lock request. In this embodiment, the Peer Node continues to examine the lock request by bit-wise exclusive OR'ing the integer value in the intent mode for the lock request against the deny mode specified by the lock already existing in the Peer Node's Lock Broker Table (i.e., the "intent mode/deny mode comparison")(Block 306).

If the result of this bit-wise comparison is "NO" for any of the bits, the comparison fails (Block 308). At which instance, the Peer Node sends a denial of the request back to the First Node (i.e., the requesting Node) (Block 309). Processing then continues in FIG. 2 or 4 with Block 210 and following the "YES" path to Block 211. Effectively, this "intent mode/deny mode comparison" determines whether the requested use of the Resource requires a usage already denied by the existing lock. For example, a Client might request to utilize a file in a read and write state. This request would conflict with any other Client, already holding a lock, who also desires to read and write to the file. Since, in this example, both Clients can not simultaneously have write authority, the first to request the write is the lock holder and all subsequent requesters will be denied by the lock holder.

Referring again to FIG. 3, if the "intent mode/deny mode comparison" passes (Block 308), the process continues with the Peer Node bit-wise comparing the deny mode of the lock request against the intent mode of the existing lock (i.e., the "deny mode/intent mode comparison")(Block 310). This comparison is also performed on a bit-wise basis using an exclusive OR'ing methodology.

If the result of this bit-wise comparison is "NO" for any of the bits, the comparison fails (Block 312). At which instance, the Peer Node sends a denial of the request back to the First Node (i.e., the requesting Node)(Block 314). Processing then continues in FIG. 2 or 4 with Block 210 and following the "YES" path to Block 211. Effectively, this "deny mode/intent mode comparison" determines whether the pending lock request would deny the existing lock from utilizing the Resource in a manner already intended by the existing lock. For example, a Client might request to utilize a display monitor such that only their information is displayed on the screen. This request would conflict with another Client, already holding an active lock, who also desires to display information on the screen. Since the First Node's lock request would disrupt the Peer Node's active lock, the Peer Node rejects the lock request.

Further, while the above described contention and evaluation processes utilized to determine whether to approve a lock request are implemented using an exclusive OR'ing bit-wise comparison of integer values, it is to be appreciated that the present invention is not so limited. Other logical operations may be utilized that reach similar results. Similarly, other comparisons may be utilized. For example, for certain Resources (such as, a printer which may be either "in use" or "not in use"), the contention and evaluation process may entail comparing only one status flag. Similarly, for more complex operations (such as, data file sharing and manipulation operations), the contention and evaluation process may be extremely complex and may involve factors other than whether the Resource is currently being utilized. Such other factors may included, but are not limited to: the anticipated amount of time that a specific Resource will be utilized for a specific task; who is requesting the Resource (for example, certain Nodes may have priority over other Nodes); and various other factors. In short, the present invention may support any type of contention system that utilizes locally kept locks to determine whether other Nodes on a Cluster may utilize a specific Resource in a given manner.

An example, of the beforementioned lock brokering techniques, is now provided with reference to FIG. 1. As shown in FIG. 1, for Node A 102, two exemplary pending lock requests are shown in the Lock Broker Table 126. The requests are for "Printer A 104 and PC#1 116. As discussed previously herein, each of these requests are suitably communicated to the Peer Nodes (i.e., Node B 108 and Node C 114) for the Cluster 100.

Upon receiving the request, Node B examines its Lock Broker Table 128 and determines whether a lock for the Resource exists. With respect to the request for Printer A 104, neither Node B's Lock Broker Table 128 nor Node C's Lock Broker Table 130 contains a lock for the Printer A Resource. As such, this lock request is immediately approved by both Node B and Node C (i.e., the answer to the query in Block 304 of FIG. 3 is "NO").

With respect to the pending request for PC#1 116, this request is sent to each Peer Node. For Node B 108, its Lock Broker Table 128 does not contain a lock for the Resource identified as PC#1 116. As such, Node B returns an "Approved" status to the Node A lock request for PC#1 116. However, Node C's Lock Broker Table 130 contains a lock for the same Resource. As such, the first query in Block 304 (FIG. 3) returns a "YES" result such that the process continues with the "intent mode/deny mode comparison" previously described above.

Specifically, the Node C CMLOCK daemon compares, using an exclusive OR operation, the intent mode for the Node A PC#1 116 lock request and the deny mode for the Node C PC#1 116 active lock. Table 1, below, shows the result of this bit-wise comparison.

TABLE 1

| | | | | |
|---|---|---|---|---|
| PC#1 Intent Mode (i.e., pending lock request) | 0 | 1 | 0 | 0 |
| PC#1 Deny Mode (i.e., active lock) | 1 | 0 | 0 | 1 |

TABLE 1-continued

| | | | | |
|---|---|---|---|---|
| RESULT (i.e., compares each column to ensure only a "1" is present in either row) | YES | YES | YES | YES |

Since the lock request passed the query by having each bit-wise comparison return a "YES" result (see Block 308, FIG. 3), the process continues with the Node C 114 CMLOCK daemon performing the "deny mode/intent mode comparison" (i.e., Block 310, FIG. 3). Specifically, the Node C CMLOCK daemon compares, using an exclusive OR operation, the deny mode for the Node A PC#1 lock request and the intent mode for the Node C PC#1 active lock. Table 2, below, shows the result of this bit-wise comparison.

TABLE 2

| | | | | |
|---|---|---|---|---|
| Node A, PC#1 Deny Mode (i.e., pending lock request) | 1 | 1 | 0 | 1 |
| Node C, PC#1 Intent Mode (i.e., active lock) | 1 | 0 | 1 | 0 |
| RESULT (i.e., compares each column to ensure only a "1" is present in either row) | NO | YES | YES | YES |

For this query, the lock request does not pass because the fourth bit of the lock request for Node A PC#1 deny mode and the fourth bit of the active lock request for the Node C PC#1 intent mode both are a "1", which when exclusively "OR'ed" results in a "NO". For this example, the NO indicates that a particular flag (designating a feature or aspect of the specified Resource) is desired to be exclusively set for the requesting lock while the active lock has already specified an intent to utilize the feature designated by the flag. As such, the Node A PC#1 pending lock request would be denied by Node C and processing would continue in FIG. 3 with Block 309.

In another embodiment, the present invention also provides the capability of determining the status of the various locks held by any Node on a Cluster. In this embodiment, the Node desiring to know which locks are held by its Peer Nodes sends a request to each Peer Node. The request merely asks the Peer Node to identify those locks the Peer Node currently holds, including the lock name, the intent mode and the deny mode. Based upon this information, the requesting Node, via the CMLOCK daemon or another software routine, may create a "Held Locks" table or listing that identifies to the Client the locks held. Further, various other information may be stored in the Held Locks table, including, but not limited to, when a lock was initiated and when the lock is supposed to end. This information may be maintained by each Peer Node's CMLOCK daemon or another software routine. This information may be supplied to the requesting Node's Held Locks table upon request. As such, the present invention may be configured to provide an indication of the length of time all the various locks on the Cluster have been held and other information which may assist Cluster managers (whether human or automated) in determining "hang-ups" in the Cluster's operations (for example, a "hung" print job that prevents other Clients on the Cluster from utilizing a printer). As such, the present invention also facilitates the maintenance and trouble shooting of Clusters, Nodes, and/or Resources via the lock request features provided by the CMLOCK daemon.

While the present invention has been described with reference to an illustrative Cluster representation and various process flows, it is to be appreciated that larger or smaller Clusters, more or less Nodes and or greater or fewer Resources may be utilized on any system for which the present invention is utilized to establish and monitor locks on Resources. Further, it is to be appreciated that fewer and/or greater steps may be utilized, as desired, in the process flows of the present invention. As such, the present invention is to be construed as covering those subject matters discussed supported herein in addition to those equivalents thereof as expressed in the following claims.

The invention claimed is:

1. A process for brokering of locks used on a clustered computer system to control access to Resources of a Cluster by determining whether a Resource on the Cluster may be locked by a First Node, wherein the Cluster includes the First Node and at least one Peer Node, the process comprising:
   communicating a request by the First Node to establish a lock on a Resource accessible through the Cluster;
   determining whether the at least one Peer Node on the Cluster holds an active lock on the Resource;
   if an active lock on the Resource is not held by any of the at least one Peer Node, approving the lock request; and
   if an active lock on the Resource is held by any of the at least one Peer Node further comprising:
      determining for each active lock held on the Resource whether the requested lock conflicts with the active lock;
      if the requested lock does not conflict with the active lock, approving the lock request; and
      if the requested lock conflicts with the active lock, denying the lock request.

2. The process of claim 1, wherein the lock request further comprises:
   a lock name;
   an intent mode; and
   a deny mode, wherein the lock name provides an identification of the Resource.

3. The process of claim 2, wherein the active lock further comprises:
   a lock name;
   an intent mode; and
   a deny mode, wherein the lock name provides an identification of the Resource.

4. The process of claim 3, wherein the determination of whether an active lock on the Resource is held by any of the at least one Peer Node further comprises:
   comparing the lock name of the requested lock with the lock name of each active lock held by each of the at least one Peer Node;
   determining that an active lock is held on the Resource if the lock name of the requested lock and the lock name of any active lock held by any of the at least one Peer Node identifies the same Resource; and
   determining that an active lock is not held on the Resource if the lock name of the requested lock and the lock name of every active lock held by any of the at least one Peer Node does not identify the same Resource.

5. The process of claim 4, wherein the comparisons of the lock names are accomplished at each of the at least one Peer Node and further comprise examining each entry in a Lock Broker Table.

6. The process of claim 5, wherein each of the at least one Peer Node maintains a separate Lock Broker Table.

7. The process of claim 3, wherein the determination of whether the requested lock conflicts with the active lock further comprises:

comparing the intent mode of the lock request with the deny mode of the active lock; and comparing the deny mode of the active lock with the intent mode of the lock request;

whereupon failure of either of the comparing steps, the lock request is denied and whereupon passing of both of the comparing steps, the lock request is approved.

8. The process of claim 7, whereupon obtaining approval of the requested lock from each of the at least one Peer Node, the First Node establishes an active lock on the Resource.

9. The process of claim 7, whereupon obtaining a denial of the lock request, the process further comprises;

placing the lock request in a pending state at the Peer Node;

awaiting notification that the active lock which conflicted with the lock request has been released; and repeating the process identified in claim 1.

10. The process of claim 1, wherein the Resource further comprises:

at least one virtual or real device, accessible through the Cluster, selected from the group consisting of: a data file, a database, a printer, a server, a display monitor, a personal computer, and an element of a personal computer.

11. The process of claim 1, wherein the lock request further comprises a read/write request.

12. A process for implementing a Cluster wide lock broker to control access to Resources on a clustered computer system, comprising:

installing a lock broker daemon on each Node of a Cluster, wherein the Cluster includes at least two Nodes;

establishing a Lock Broker Table associated with each lock broker daemon; and determining whether a lock request will be granted by comparing the lock request with each entry in each Lock Broker Table;

whereupon receiving at a First Node a request from a Client to establish a lock on a Resource connected to the Cluster, the lock broker daemon communicates the lock request to each Peer Node on the Cluster; and whereupon receiving the lock request, each Peer Node determines whether the requested lock conflicts with any active lock already held by a Client associated with the Peer Node by examining the contents of the Lock Broker Table associated with the lock broker daemon for the Peer Node, by determining whether an active lock on the Resource is held by any Peer Node, comprising:

comparing a lock name of the lock request with a lock name of each active lock held by each Peer Node, determining that an active lock is held on the Resource if the lock name of the lock request and the lock name of any active lock held by any Peer Node identifies the same Resource, and determining that an active lock is not held on the Resource if the lock name of the lock request and the lock name of every active lock held by any Peer Node does not identify the same Resource.

13. The process of claim 12, wherein the process is implemented in conjunction with the Cluster management system.

14. The process of claim 12, wherein the process further comprises inserting the lock request as an active lock into the First Node's Lock Broker Table when the lock request is approved by every Peer Node on the Cluster.

15. The process of claim 14, wherein the process further comprises removing the active lock from the First Node's Lock Broker Table when the Client is finished utilizing the Resource.

16. The process of claim 14, wherein the process further comprises deleting the active lock from the First Node's Lock Broker Table when a connection between the First Node and the Resource is disconnected.

17. A computer readable medium containing instructions for determining whether a Client may establish a lock on a Resource accessible through a Cluster, wherein the Client is on a First Node of the Cluster and the Resource is on a Peer Node of the Cluster, by:

communicating a request by the Client via the First Node to establish a lock on the Resource;

determining whether at least one Peer Node holds an active lock on the Resource;

if an active lock on the Resource is not held by any of the at least one Peer Node, approving the lock request; and if an active lock on the Resource is held by any of the at least one Peer Node, further comprising:

determining for each active lock held on the Resource whether the requested lock conflicts with the active lock;

if the requested lock does not conflict with the active lock, approving the lock request; and if the requested lock conflicts with the active lock, denying the lock request.

18. A computer readable medium containing instructions for determining whether a requested lock conflicts with an active lock, wherein each of the requested lock and the active lock include a lock name identifying a Resource on a Cluster, an intent mode, and a deny mode; by:

comparing a lock name for the requested lock against the lock name of the active lock;

determining that an active lock is held on a Resource if the lock name of the requested lock and the lock name of the active lock identify the same Resource;

determining that an active lock is not held on the Resource if the lock name of the requested lock and the lock name of the active lock do not identify the same Resource;

comparing the intent mode of the lock requested lock with the deny mode of the active lock; and comparing the deny mode of the active lock with the intent mode of the requested lock;

whereupon failure of either of the comparing steps, the lock request is denied and whereupon passing of both of the comparing steps, the lock request is approved; and repeating the process for each active lock held by each Peer Node on the Cluster.

19. The computer readable medium of claim 18, wherein each active lock held by a Peer Node is identified in a Lock Broker Table managed by a lock broker daemon on the Peer Node and wherein the lock request is communicated to every Peer Node on the Cluster for the determination of whether an active lock is held on the Resource.

* * * * *